Dec. 19, 1944.    A. B. WHITE    2,365,611
WELDING SYSTEM
Filed July 24, 1942    3 Sheets-Sheet 1

WITNESSES:
Robert C. Baird
G. V. Giolma

INVENTOR
Alfred B. White.
BY
G. M. Crawford
ATTORNEY

Dec. 19, 1944.   A. B. WHITE   2,365,611
WELDING SYSTEM
Filed July 24, 1942   3 Sheets-Sheet 2

WITNESSES:
Robert C. Baird
G. V. Giolma

INVENTOR
Alfred B. White.
BY G. M. Crawford
ATTORNEY

Patented Dec. 19, 1944

2,365,611

UNITED STATES PATENT OFFICE 2,365,611

WELDING SYSTEM

Alfred B. White, Murrysville, Pa., assignor to Westinghouse Electric & Manufacturing Company, East Pittsburgh, Pa., a corporation of Pennsylvania Application July 24, 1942, Serial No. 452,195

16 Claims. (Cl. 315—279)

My invention relates, generally, to welding systems and it has reference, in particular, to alternating current arc welding systems.

Generally stated, it is an object of my invention to provide an improved alternating current arc welding system which is simple and inexpensive to manufacture and which has improved welding characteristics.

More specifically, it is an object of my invention to provide for predetermining and controlling the value of the welding current of transformer type alternating current arc welding systems by means of controllable saturable reactors.

It is also an object of my invention to provide for reducing the open circuit voltage of an alternating current welder to a safe value and to provide for automatically increasing the voltage available in the welding circuit to maintain an arc.

Another object of my invention is to provide for controlling the impedance of a voltage reducing, saturable reactor in the primary or secondary circuit of a welding transformer in accordance with the value of the current flowing in one of the transformer windings.

An important object of my invention is to provide for reducing the open circuit voltage of an alternating current transformer and to provide for reducing the time required for the load impedance to reach a predetermined value upon closure of the secondary circuit.

Yet another object of my invention is to provide, in a simple and effective manner, for reducing the welding current provided by a transformer type welder at the end of a welding operation to eliminate the usual weld crater.

Still another object of my invention is to provide for controlling a saturable reactor in the primary or secondary circuit of a transformer type welder to reduce the welding current at the end of a welding operation.

Another important object of my invention is to provide for reducing the welding current and increasing the secondary voltage of a transformer type welder to facilitate reduction of the weld crater at the end of a welding operation.

A still further object of my invention is to provide for controlling the output of welding apparatus to produce a surge of welding current initially to facilitate striking an arc.

One object of the invention is to provide for using a controllable saturable reactor to predetermine and control the normal welding current, increase it momentarily during initiating of an arc and decrease it at the end of a welding operation to reduce the usual weld crater.

Other objects will in part be obvious, and will in part be described hereinafter.

According to my invention, control of a transformer type arc welder is secured by connecting a saturable reactor in the primary or secondary circuit of the welder to reduce the open circuit voltage thereof. A current transformer in the secondary circuit of the welder in conjunction with a rectifier is connected to energize the direct current control winding of the reactor so as to reduce the impedance thereof upon closure of the secondary circuit. The current output of the welder is predetermined by adjusting an impedance in the control winding circuit. Initiation of the arc is greatly facilitated by shunting a portion of the impedance in the control winding circuit so as to permit a surge of welding current to flow momentarily for at least the lower values of normal welding current for which initiation of an arc is sometimes difficult to effect. Termination of the arc is improved by providing for reducing the welding current immediately prior to the cessation of a welding operation by increasing the impedance in the control winding circuit to eliminate the usual weld crater.

For a more complete understanding of the nature and scope of my invention reference may be had to the accompanying drawings, in which.

Figure 1:
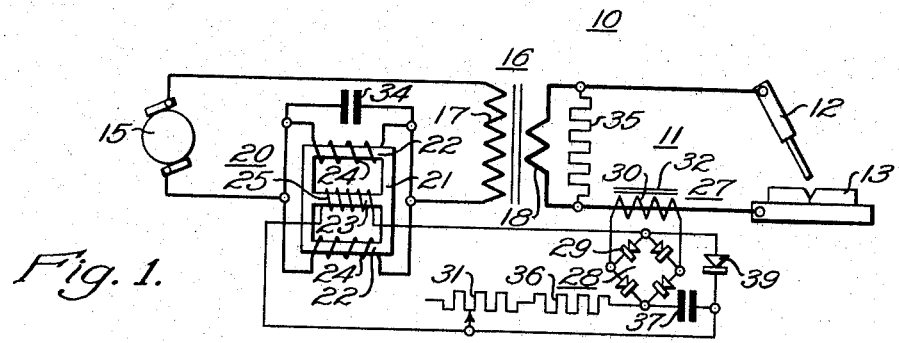
Figure 1 illustrates diagrammatically a welding system embodying the principal features of the invention.

Referring to Fig. 1, the reference numeral 10 may denote, generally, an alternating current arc welding system wherein a welding circuit 11 including an electrode 12 and a workpiece 13 upon which a welding operation is to be performed, may be energized from an alternating current source 15 by means of a transformer type welder 16 having a primary winding 17 energized from the source and a secondary winding 18 connected to the welding circuit.

In order to reduce the open circuit voltage between the electrode 12 and workpiece 13 to a safe value so that the welding operator will not be subject to excessive electric shock through contacting the electrode and workpiece, means such as the variable impedance 20 may be connected between the primary winding 17 and the source 15. The impedance 20 may, for example, comprise a saturable reactor having a magnetic core 21 with outer leg portions 22 and an intermediate leg portion 23. Impedance windings 24 positioned on the outer leg portions 22 may be connected in series with the primary winding 17 and the source 15. A direct current control winding 25 may be positioned on the intermediate leg portion 23 for effecting saturation of the core member 21 to vary the impedance of the windings 24.

In order to control the impedance of the windings 24 in response to closure of the welding circuit 11, energization of the control winding 25 may be effected in response to a predetermined current flow in either of the transformer windings. For example, a current transformer 27 may be connected in series with the secondary winding 18 of the welding transformer 16. The control winding 25 may be energized from a rectifier bridge circuit 28 of rectifier devices 29 connected across the secondary winding 30 of the current transformer. Means such as the control resistor 31 may be provided for controlling the current in the control winding so as to predetermine the welding current.

Under open circuit conditions the impedance of the reactor windings 24 is relatively high, so that the impedance drop across the primary winding 17 of the welding transformer is greatly reduced, causing a reduction in the open circuit voltage applied to the welding circuit 11. Upon contact of the electrode 12 with the workpiece 13 a current flows in the welding circuit 11. A voltage appears across the secondary winding 30 of the current transformer 27 effecting energization of the control winding 25 of the reactor 20 so as to reduce the impedance of the reactor windings 24 and apply an increased voltage to the primary winding 17 of the welding transformer for striking and maintaining an arc.

Figure 3:
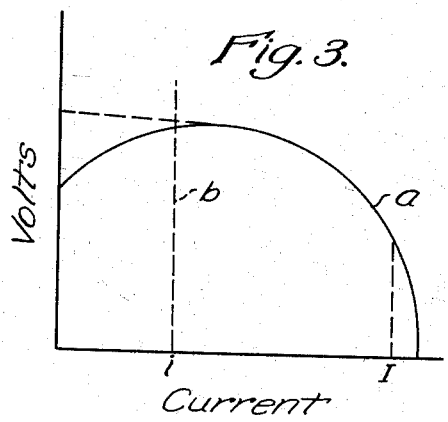
Fig. 3 shows a performance curve characteristic of the welding systems shown in Figs. 1 and 2.

Referring to Figs. 1 and 3 it will be realized that in order to produce a characteristic load curve $a$ such as shown in Fig. 3, it will be desirable to effect saturation of the magnetic core 32 of the transformer 27 for a value of current $i$ designated by the dotted line $b$ which is substantially below the normal range of welding currents. This is necessary in order to provide a drooping volt ampere or load characteristic curve $a$ having a relatively low open circuit voltage with an intermediate relatively high closed circuit voltage at a value of current less than the normal welding current in order to facilitate maintaining an arc during a welding operation.

Because of the normally, relatively high impedance of the primary winding 17 of the welding transformer 16 on open circuit, it is sometimes difficult to secure a reactor 20 having a sufficiently high impedance to appreciably reduce the open circuit voltage applied to the welding circuit 11. One method of increasing the effective impedance of the reactor 20 is to connect a condenser 34 in parallel with the impedance windings 24 thereof, so as to produce a resonant or near resonant circuit. The voltage drop across the reactor may be greatly increased by this expedient to reduce the open circuit voltage applied to the welding circuit 11 to the desired safe value. Since the open circuit voltage applied to the welding circuit 11 depends on the reactance in series with the primary 17 of the welding transformer the ratio of the reactance of the impedance windings 24 and the transformer primary winding 17 may be adjusted by other methods, such as by decreasing the no load impedance of either the transformer 16 or the saturable reactor 20 by introducing air gaps in the cores thereof, or by connecting an impedance 35 in parallel with the transformer 16 on either the primary or secondary side. The impedance 35 may comprise resistance or capacitative or inductive reactances.

If the inductances of the control winding 25 is relatively large, this tends to limit the rate of change of current in the control circuit and correspondingly limits the rate of build-up of the current in the welding circuit 11 to its final value. Increase of the rate of build-up of the welding current may be obtained by inserting a control resistance 36 in series with the control winding 25 and designing the current transformer 27 to produce a sufficiently higher terminal voltage to provide the same steady state value of control current through the control winding 25 as before. By increasing the resistance in the control winding circuit the time characteristic of the control winding circuit may be reduced so that the rate of change of current therein is increased. The rate of current build-up in the welding circuit may also be increased by connecting a condenser 37 in parallel circuit relation with the control resistance 36 so as to reduce still further the time characteristic of the control winding circuit.

While it is desirable that the rate of change of current in the control winding 25, while the current is increasing, be increased to a maximum, it is preferable that the control current does not decrease at too high a rate when the arc current decreases. Delay in the decrease of the control winding current may be effected by suitable means, such as the unidirectional current device 39 which may be connected across the control winding 25 to short circuit inductive voltages produced when the voltage of the current transformer 27 suddenly decreases.

Figure 2:
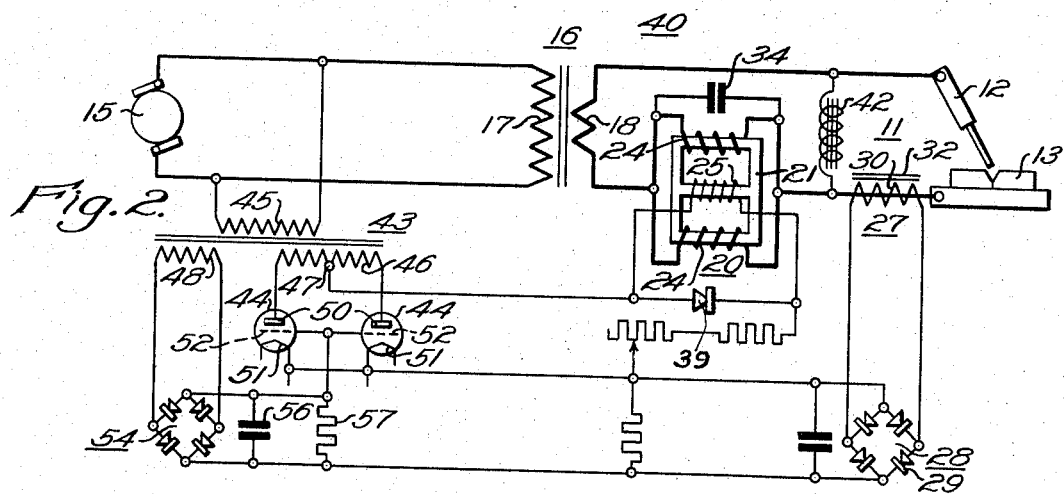
Fig. 2 illustrates diagrammatically a modification of the invention.

In Fig. 2 the reference numeral 40 may denote, generally, a welding system utilizing the same general principles disclosed in connection with the system of Fig. 1 but embodying a different embodiment thereof. The welding circuit 11 may, as hereinbefore, be energized from an alternating current source 15 by means of a welding transformer 16. The saturable reactor 20 may, in this instance, be connected in series with the secondary winding 18 instead of in series with the primary winding 17, and a suitable impedance 42 may be provided to take the place of the no load impedance of the primary winding of the transformer 16 with respect to the reactor 20.

Energization of the control winding 25 may be effected from the source 15 through a control transformer 43 and suitable control means such as the valves 44. The primary winding 45 of the control transformer may be connected to the source and a secondary winding 46 may be provided having a center tap 47. A tertiary winding 48 may be provided on the transformer 43 for producing a control bias voltage. The valves 44 may be of the grid controlled type having anodes 50, cathodes 51 and control grids 52, and they may be connected in a well-known manner to provide full wave rectification for energizing the control winding 25 of the saturable reactor from the secondary winding 46. Suitable means such as the rectifier bridge circuit 54 and the condenser 56 may be connected to the tertiary winding 48 to provide a negative bias voltage across a control resistor 57 connected to the control grids 52, to normally maintain the valves 44 non-conductive. Control of the valves 44 may be suitably effected by applying a voltage from the rectifier bridge circuit 28 connected to the secondary winding 30 of the current transformer 27 in the welding circuit 11 to the control grids 52 in opposition to the negative bias voltage obtained from the bridge circuit 54. Energization of the control winding 25 may thus be effected in response to closure of the welding circuit 11 to reduce the impedance of the saturable reactor 20 and increase the voltage applied to the welding circuit in order to strike and maintain an arc between the electrode 12 and the workpiece 13.

Figure 4:
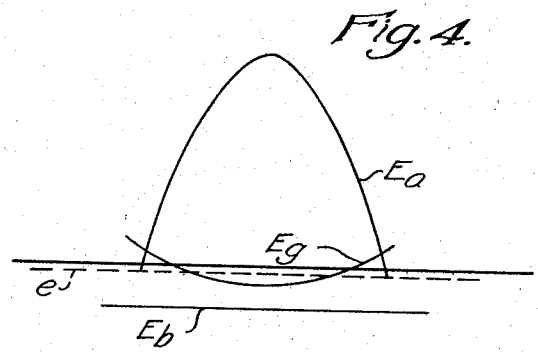
Fig. 4 shows curves illustrating the operation of the system shown in Fig. 2.

In Fig. 4 the curve $E_a$ represents the voltage between the anode and the cathode of one of the valves 44 at a time when it is positive with respect to the anode. The curve $E_g$ represents the negative voltage, which if applied to the control grid 52 of the said valve would be just sufficient to prevent the valve from becoming conductive. The curve $E_b$ may represent the bias voltage applied to the control electrodes 52 by the bridge circuit 54, while the dotted line $e$ may represent the resultant grid voltage, which is the difference between the voltages from the bridge circuits 54 and 28. When the grid voltage $e$ is of a value less than $E_g$, the valve is maintained non-conductive. When the voltage produced by the bridge circuit 28 predominates and the resultant grid voltage is greater than the voltage $E_g$, the valve is rendered conductive. Depending on the value of the voltage produced by the bridge circuit 28, the valves 44 will be rendered conductive at an early or at a late point in a given half cycle. The greater the value of the voltage produced by the bridge circuit 28, the earlier in a given half cycle the valve 44 is rendered conductive and the valve therefore continues to conduct for a greater portion of the half cycle, thus increasing the average current conducted by the valve.

Figure 5:
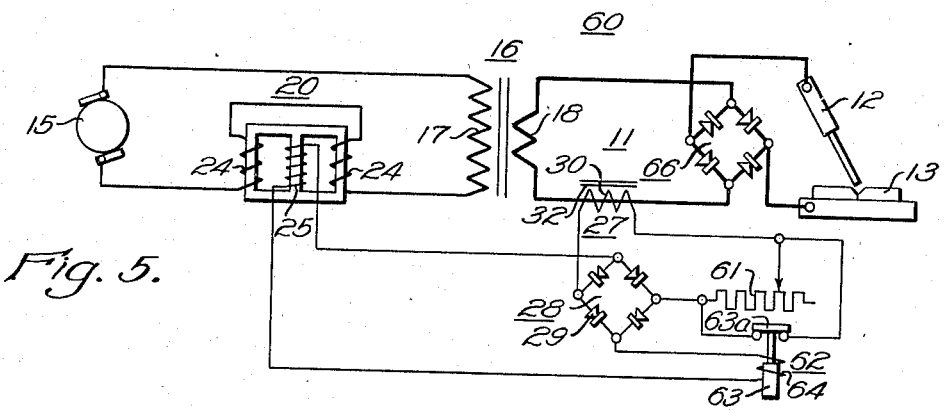
Fig. 5 is a diagrammatic view of a welding system embodying a further modification of the invention.

Referring to Fig. 5, the reference numeral 60 denotes, generally, a welding system wherein a welding circuit 11 is energized from a source 15 through a welding transformer 16 in a similar manner to that shown in Fig. 1. Reduction of the open circuit voltage applied to the welding circuit 11 may, as hereinbefore, be effected by a saturable reactor 20 having impedance windings 24 connected in series with the primary winding 17 of the transformer. Energization of the control winding 25 of the reactor may be effected by means of a rectifier bridge circuit 28 connected to the secondary winding 30 of a current transformer 27 in the welding circuit in series circuit relation with a control impedance 61 for predetermining the normal welding current supplied to the welding circuit 11. The impedance 61 may be connected between the bridge circuit 28 and the current transformer 27, so that the bridge circuit is connected directly across the control winding 25, whereby it may function as an inductive bypass also.

Where means are used to predetermine the normal welding current of a welder of the transformer type it has been found that the striking of an arc between the electrode 12 and workpiece 13 may be greatly facilitated by providing for a greater than normal flow of current, at least momentarily, during the striking of the arc. In order to provide for greater than normal welding current during the initiation of an arc, at least for the lower values of welding current for which it is more difficult to strike and maintain an arc, control means denoted, generally, by the numeral 62 may be provided for rendering the control effect of the saturable reactor 20 ineffective during initiation of the arc. For example, a control relay 63 may be provided, having contact members 63a connected in shunt relation with the control impedance 61 to normally short circuit the control impedance. The operating winding 64 of the control relay may be connected in series circuit relation with the control winding 25 so that the relay operates only after a certain delay when the current in the winding 25 reaches a predetermined value. The control impedance 61 is then inserted into the control circuit to reduce the current in the control winding 25 so that the welding current is thereby limited to the predetermined value for which the control impedance 31 may have been adjusted.

By the use of a rectifier circuit 66, the alternating current arc welder of Fig. 5 may be converted into a direct current welder. The advantages of output control secured by the reactor 20 and the current transformer 27 may be retained as may also the advantages of the increased arc striking current secured by utilizing the control relay 63 and control impedance 61. The use of the rectifier circuit 66 is not limited to the circuit shown in Fig. 5, but may be used with any of the other circuits without departing from the scope of the invention.

Figure 6:
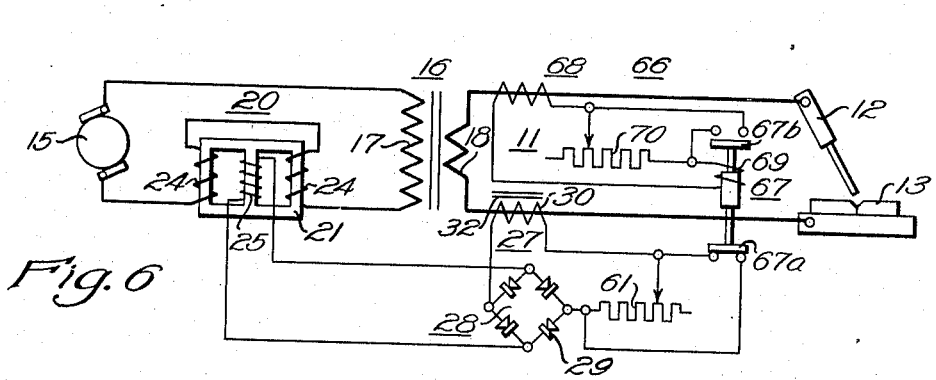
Fig. 6 is a diagrammatic view of a welding system embodying other features of the invention.

In Fig. 6 the reference numeral 66 may denote, generally, a welding system wherein the welding circuit 11 is energized as hereinbefore described from a source 15 through a transformer 16, the open circuit voltage of which is controlled by means of a saturable reactor 20 connected in the primary circuit and a current transformer 27 connected in the secondary circuit for controlling the energization of the reactor control winding 25.

Suitable control means may be provided for rendering the saturable reactor 20 ineffective at least momentarily during initiation of an arc to limit the normal welding current to the predetermined value for which the adjustable control impedance 61 may have been preset. For example, a control relay 67 may be provided having normally closed contact members 67a in bridged relation with the adjustable impedance 61. A current transformer 68 may be provided for energizing the operating winding 69 of the control relay 67. The current transformer 68 may, for example, be connected in series circuit relation with the secondary winding 18 of the welding transformer so that the relay winding 69 is energized when current flows in the welding circuit. A control resistor 70 may be provided for adjusting the voltage applied to the operating winding 69 so that the relay 67 does not operate until the welding current approaches its maximum value. Normally opened contact members 67b may be provided for short circuiting the control resistor 70 to insure continued operation of the relay 67 when the welding current is reduced upon the opening of the contact members 67a.

Figure 7:
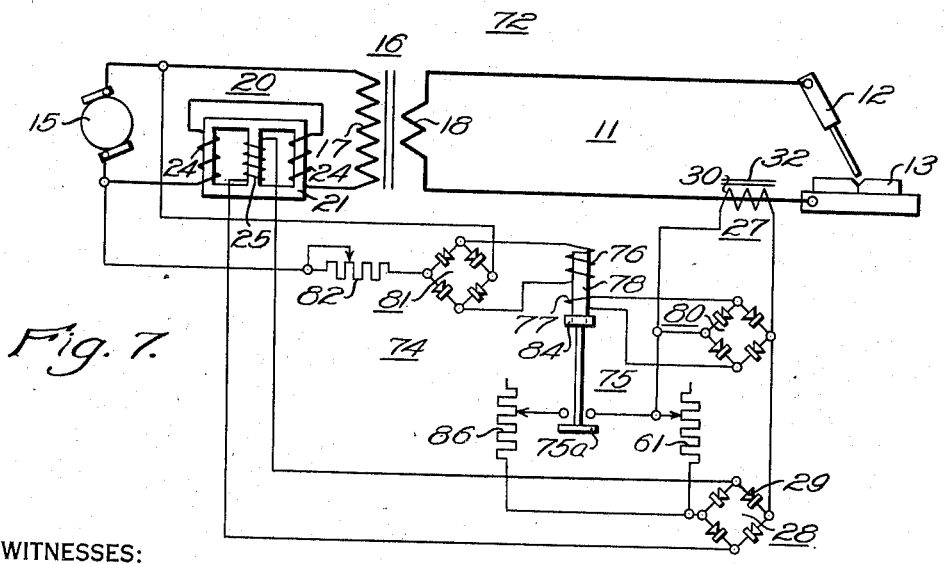
Fig. 7 is a diagrammatic view of a welding system embodying another modification of the invention.

Referring to Fig. 7, the reference numeral 72 may denote, generally, a welding system wherein a welding circuit 11 is connected to a source of alternating current 15 by a welding transformer 16. A saturable reactor 20 operable in response to energization of its control winding 25 from a current transformer 27 connected in series with the secondary winding 18 of the transformer provides for reducing the open circuit voltage applied to the welding circuit and provides for automatically increasing the voltage applied to the welding circuit upon contact of the electrode 12 with the workpiece 13 to produce a predetermined normal value of welding current as determined by the setting of the adjustable impedance 61 in the circuit of the control winding.

In order to provide for effecting a substantial surge of welding current during initiation of the arc to facilitate establishing the arc, control means 74 may be provided. For example, a time delay relay 75 having oppositely wound main and neutralizing windings 76 and 77, respectively, operating on an armature 78 may be utilized to render the adjustable impedance 61 substantially ineffective for a predetermined time after closure of the welding circuit 11. The neutralizing winding 77 may, for example, be energized from a rectifier bridge circuit 80 connected across the secondary winding 30 of the current transformer 27 and the welding circuit. The main winding 76 may be energized from a suitable source being, for example, connected to the source 15 by a rectifier bridge circuit 81 and an adjustable impedance 82. Normal energization of the operating winding 76 maintains the relay 75 in the operating position so that the contact members 75a, which are connected in shunt relation with the adjustable impedance 61 are closed. When the welding circuit is closed and the welding current reaches a predetermined value the neutralizing winding 77 becomes energized sufficiently to overcome the effect of the operating winding 76, whereupon the armature 78 returns to the deenergized position after a predetermined time, determined by the rate of decay of the magnetic flux therein, the rate of which may be retarded by means such as the short circuiting damper winding 84. An adjustable control resistance 86 connected in series circuit relation with the contact members 75a and the adjustable impedance 61 provides for adjusting the value of the current surge relative to the predetermined normal value of welding current for which the impedance 61 may be adjusted.

Figure 8:
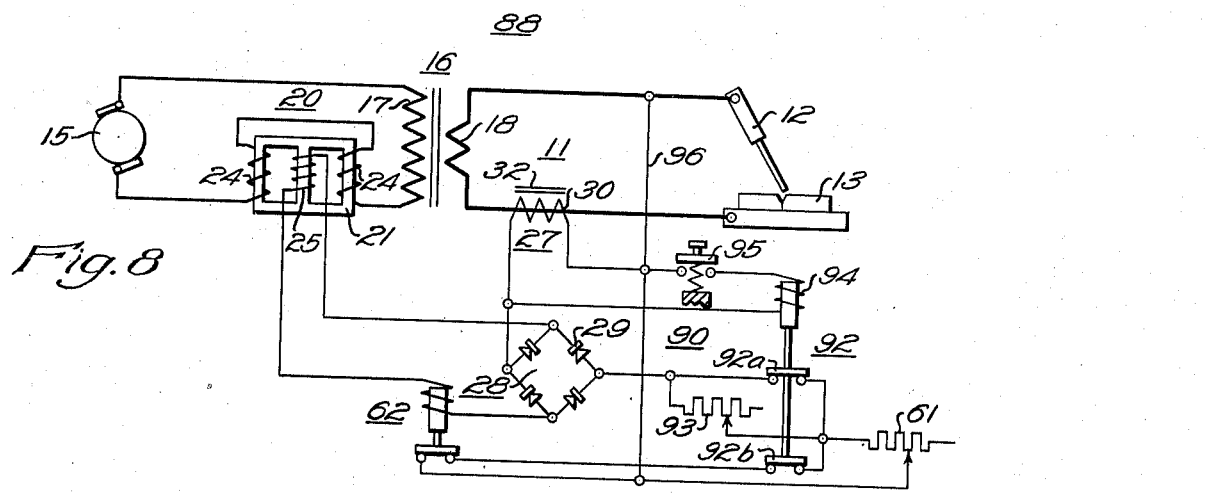
Fig. 8 is a diagrammatic view of a welding system illustrating yet another modification of the invention.

Referring to Fig. 8, the reference numeral 88 may denote, generally, a welding system wherein a welding circuit 11 is connected to a source 15 by means of a transformer 16. A saturable reactor 20 may be provided to control the open circuit voltage applied to the welding circuit 11 under the control of a current transformer 27 connected in series circuit relation with one of the transformer windings. As described hereinbefore in detail, control means 62 may be provided for shunting at least a portion of the control impedance 61 which predetermines the degree of saturation of the reactor 20 and hence the normal value of the welding current in order to provide an initial surge of current to assist in establishing an arc between the electrode 12 and the workpiece 13.

In order to provide better welds, suitable control means denoted, generally, by the numeral 90 may be provided for effecting a reduction in the weld crater which usually occurs at the termination of a weld. For example, a control relay 92 may be provided having normally closed contacts 92a and 92b for normally shunting an adjustable control resistor 93 connected in series circuit relation with the rectifier bridge circuit 28 and the secondary winding 30 of the current transformer 27, and completing the connection of the adjustable impedance 61 in the same circuit, respectively. The operating winding 94 of the control relay 90 may be energized from a suitable source such as the secondary winding 30 of the current transformer 27 by the control switch 95, which may be mounted on the handle of the welding electrode 12 or otherwise positioned adjacent the workpiece. If it is desired to use one of the welding leads as a conductor for the switch 95, a connection 96 may be provided, as shown.

As the operator approaches the end of the weld he may close the switch 95 energizing the operating winding 94 and actuating the control relay 92 to the operating position. The control resistor 93 is thereby connected in series circuit relation with the adjustable impedance 61. The current through the control winding 25 of the reactor 20 is thereby reduced, increasing the impedance of the reactor and reducing the welding current accordingly. The welding operation is thus terminated more or less gradually, instead of abruptly and the penetration of the arc is reduced so that the weld crater at the end of the weld is substantially eliminated.

Figure 9:
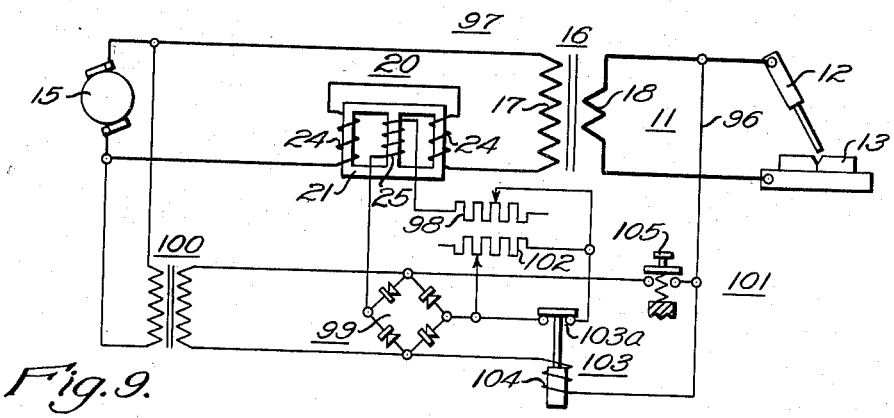
Fig. 9 is a diagrammatic view of a welding system illustrating still other features of the invention.

Referring to Fig. 9, the reference numeral 97 may denote, generally, a welding system wherein a saturable reactor 20 is connected in series with the primary winding 17 of a welding transformer 16 which is utilized to energize a welding circuit 11.

The control winding 25 of the reactor 20 may be energized in a suitable manner as by means of a direct current voltage applied thereto through a control resistor 98 and a rectifier bridge circuit 99, which may be energized from the source 15 through a transformer 100. Control of the normal welding current may be obtained by effecting different adjustments of the control resistor 98.

In order to provide in this instance for reducing or substantially eliminating the usual weld crater at the end of a weld, control means 101 may be provided. For example, an additional control resistor 102 may be connected in series circuit relation with the control winding 25 of the reactor and normally shunted by means of the normally closed contact members 103a of control relay 103. The operating winding 104 of the control relay may be energized through a suitable control switch 105 from any suitable source being, for example, connected thereby to the rectifier bridge circuit 99, so that the operator may operate the switch 105 near the end of a welding operation to reduce the welding current and limit the weld crater.

Figure 10:
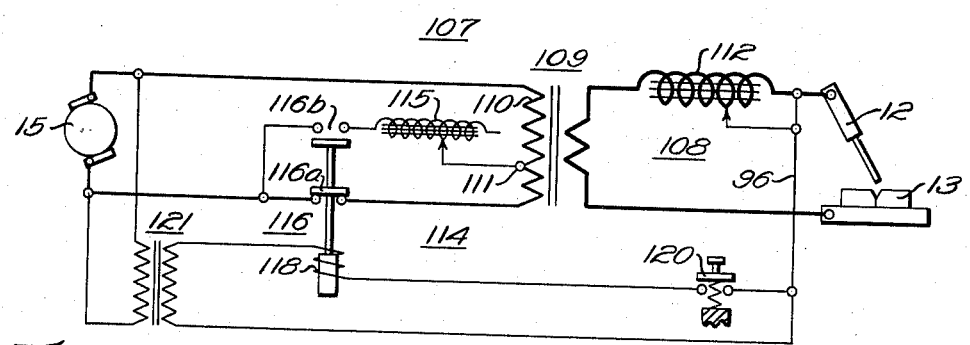
Fig. 10 is a diagrammatic view of a welding system illustrating a yet further modification of the invention.

Referring to Fig. 10, the reference numeral 107 may denote, generally, a welding system wherein a welding circuit 108 may be connected to a source of alternating current 15 by means of a transformer 109 having a primary winding 110 with a tap 111 adjacent one end thereof. An adjustable impedance 112 may be provided in the welding circuit to predetermine the normal welding current.

In order to provide for reducing the crater at the end of a weld, control means denoted, generally, by the numeral 114 may be provided. For example, an adjustable impedance 115 may be connected to the tap 111 of the transformer 109 and a control relay 116 may be provided having normally closed contact members 116a connecting one terminal of the transformer 109 to the source and normally open contact members 116b to connect the tap 111 to the source through the adjustable impedance 115. The operating winding 118 of the control relay may be energized under the control of a suitable push button switch 120 from any suitable source such as the control transformer 121 which may be connected to the source 15.

When normally welding the adjustable impedance 112 may be preset to predetermine the normal flow of welding current for the desired welding operation. During welding the control relay 116 is in the deenergized position so that the primary winding 110 of the welding transformer is connected to the source 15 through the normally closed contact members 116a. Near the end of the welding operation the operator may operate push button switch 120 to connect the operating winding 118 of the control relay 116 to the source 15 through the control transformer 121. The control relay operates opening contact members 116a and closing contact members 116b so that one terminal of the transformer is disconnected from the source and the tap 111 of the transformer is connected to the source through the adjustable impedance 115. The welding current is thereby reduced through the insertion of the additional impedance in series with the primary winding of the welding transformer. At the same time the ratio between the turns of the primary and secondary windings is changed, since the number of effective turns of the primary winding is reduced. The secondary voltage is thereby increased, providing a higher open circuit voltage which permits the operator to draw a longer arc without fear of it being extinguished. The arc thus drawn may be permitted to move about the zone of welding to fill in and level up the usual weld crater to produce a relatively smooth and even finish to the weld.

From the above description and accompanying drawings, it will be apparent that I have provided in a new and novel manner for improving the initiating, operating and terminating characteristics of transformer type alternating current type welders. By practicing my invention arcs may be more easily initiated, smooth and adequate control of the normal welding current may be readily effected, and the usual crater resulting at the end of the weld may be eliminated. The normal open circuit voltage of the welder may be reduced to a safe value whereby the operator is freed from the likelihood of dangerous shocks, through automatic control of the weld control apparatus which also provides the improved initiating, operating and terminating characteristics. The control means for effecting these results is simple and inexpensive to manufacture, easy to operate and is durable in operation. It comprises a minimum number of moving parts and may be readily adapted to different types of welding transformers already in use.

Since certain changes may be made in the above description, and different embodiments of the invention may be made without departing from the spirit thereof, it is intended that all the matter contained in the above description or shown in the accompanying drawings shall be considered as illustrative and not in a limiting sense.

I claim as my invention:

1. Reduced open circuit control means for a welding transformer having a primary winding for connection to a source of alternating current and a secondary winding for supplying welding current to a welding circuit comprising, a saturable reactor having an alternating current winding connected in series circuit relation with the primary winding and a direct current control winding, and circuit means including a current transformer connected in series circuit relation with one of the transformer windings disposed to saturate when the welding current is on the order 25%–35% of the normal welding current to effect energization of the control winding in order to produce a drooping characteristic load curve having a low open circuit voltage and a relatively high voltage peak at about 25%–35% of the normal value of welding current.

2. Control means for a transformer having primary and secondary windings comprising, a saturable reactor having an alternating current winding connected in series circuit relation with one of the windings and a direct current control winding, and circuit means including a current transformer connected in series circuit relation with one of the transformer windings saturable below the normal load current of said winding and an adjustable impedance for energizing the control winding in different degrees to predetermine different values of welding current.

3. The combination with a transformer having a primary winding and a secondary winding, of a saturable reactor having an impedance winding connected in series circuit relation with the primary winding for reducing the open circuit voltage of the secondary winding and a direct current control winding, a condenser connected in parallel with the impedance winding to provide a near resonant circuit and increase the voltage drop across said winding, whereby the open circuit voltage of the secondary winding is reduced to a minimum, and circuit means energizing the control winding in accordance with the current in one of the transformer windings.

4. A control system for a welding transformer having a primary winding for connection to a source of alternating current and a secondary winding for supplying welding current to a welding circuit comprising, a saturable reactor having a core with an impedance winding connected in series circuit relation with the primary winding and a control winding energizable to produce a predetermined degree of saturation of the reactor core, and means including a current transformer disposed to saturate when the welding current is less than normal and having a primary winding connected in series circuit relation with one of the transformer windings and a secondary winding connected to the control winding having a ratio of secondary to primary turns such that the secondary voltage is greater than necessary for the desired energization of the control winding for a predetermined value of welding current so as to increase the rate of change of impedance of the reactor during transient conditions and a resistor to limit the final value of the control current.

5. A control system for a welding transformer having a primary winding for connection to an alternating current source and a secondary winding disposed to be connected to supply welding current to an electrode and work upon which a welding operation is to be performed comprising, a saturable reactor having a core with an impedance winding connected in series with the primary winding and source to reduce the open circuit voltage of the secondary winding and a direct current control winding, circuit means including a unidirectional current device energizing the control winding in response to the flow of current in the secondary circuit to produce a direct current saturating flux in the core, and unidirectional current means connected in shunt relation with the control winding to provide a closed circuit for inverse induced voltages and delay collapse of the flux in the reactor core, whereby the rate of current build-up in the secondary circuit is increased.

6. A control system for a transformer having primary and secondary windings comprising, a saturable reactor having an impedance winding connected in series circuit relation with the primary winding for reducing the open circuit voltage of the secondary winding and a direct current control winding, circuit means including an impedance device connected in series with the control winding for energizing the control winding in accordance with the current in one of the transformer windings, and means including a condenser connected in parallel with the impedance means associated with the circuit means to decrease the time constant of the circuit means and increase the rate of increase of current in the secondary circuit.

7. A reduced open circuit voltage control system for a transformer having primary and secondary windings comprising, a variable impedance having an impedance winding connected in series with the primary winding for reducing the open circuit voltage of the secondary winding and a control winding, circuit means including a current transformer saturable below the normal value of transformer current effecting energization of the control winding to reduce the effectiveness of the impedance in response to closure of the secondary circuit, and means including a condenser connected in shunt relation with a current limiting impedance in circuit relation with the control winding to increase the rate of change of current in the secondary winding.

8. An open circuit voltage control system for a principal transformer having primary and secondary windings comprising, impedance means connected in series with the primary winding to reduce the open circuit voltage of the secondary winding and having a control winding energizable to reduce the impedance of said means, and circuit means connecting the control winding to a source for energization including valve means having control grids, control means connected to apply a negative bias voltage to the control grids and means associated with said one of the transformer windings to apply a control voltage to the control grids in opposition to the bias voltage in response to a predetermined flow of current in said winding to reduce the impedance of the impedance means.

9. A control system for a welding transformer having a primary winding for connection to a source of alternating current and a secondary winding for supplying welding current to maintain an arc between an electrode and a workpiece comprising, a variable impedance device having an impedance winding connected between the primary winding and the source and a control winding energizable to vary the impedance of the device, circuit means responsive to the flow of current in one of the transformer windings to effect energization of the control winding to reduce the impedance of the impedance device to a predetermined value, and means responsive to the flow of current in one of the transformer windings operable to reduce the impedance to a minimum during initiation of the arc and return it to a predetermined higher value subsequently so as to provide an initial current surge greater than the normal predetermined value to facilitate striking the arc.

10. A welding system comprising, a welding transformer for connection to a source of alternating current, impedance means adjustable to a predetermined operating value to predetermine the normal welding current, and control means including relay means normally connected so as to be effective during the initiation of a welding arc to reduce the impedance of the impedance means, said relay means being operable after the welding current reaches a predetermined value to restore the impedance means to its predetermined operating value.

11. A welding system comprising, a welding transformer having primary and secondary windings, variable impedance means connected in series relation with the primary winding having a control winding, circuit means responsive to the energization of one of the transformer windings to effect energization of the control winding to maintain a predetermined normal welding current, and time delay means connected to control the circuit means, said time delay means being operable in response to energization of one of the transformer windings to control the energization of the control winding to permit greater than normal current flow during initiation of an arc.

12. A control system for an arc welding transformer having a primary winding for connection to a source of alternating current and a secondary winding for connection to an electrode and a workpiece to be welded comprising, a saturable reactor having an impedance winding connected in series with the primary winding and the source and a direct current control winding energizable to vary the impedance of the impedance winding, circuit means including a current transformer connected in series with the secondary winding saturable at a current below the minimum value of welding current and rectifier means connected to energize the control winding, an adjustable impedance connected to the circuit means to predetermine the normal value of welding current, and relay means bridging a portion of the impedance operable to effect the flow of greater than normal welding current during the initiation of an arc between the electrode and workpiece.

13. The combination with arc welding apparatus including a transformer having primary and secondary windings with a saturable reactor connected in series with the primary winding having a control winding for providing a reduced open circuit secondary voltage and connected to a control circuit for energization in response to energization of one of the transformer windings, of impedance means connected in the control circuit to reduce the energization of the control winding, and switch means normally rendering the impedance means ineffective operable to insert the impedance means in the control circuit to reduce the welding current adjacent the termination of a welding operation to reduce the weld crater.

14. An arc welding system comprising, a welding transformer having a primary winding for connection to a source of alternating current and a secondary winding for connection to a welding circuit, impedance means connected in series relation with one of the transformer windings and having a control winding for varying the impedance of said means, circuit means associated with one of the transformer windings for energizing the control winding in predetermined relation to the current in said one winding so as to predetermine the normal value of the welding current supplied by the secondary winding, control means responsive to the current in one of the transformer windings operable to control the circuit means to effect greater energization of the control winding during initiation of a welding arc than is necessary to determine the normal value of welding current, and means controlling the operation of the control means to determine the degree of energization of the control winding.

15. An arc welding system comprising, a transformer having primary and secondary windings for connecting a welding circuit to a source, a saturable reactor having an impedance winding connected in series circuit relation with the primary winding and a control winding, circuit means including means responsive to the current in one of the transformer windings and means for adjusting the current in the circuit means connected to energize the control winding, control means connected to normally render one of said current adjusting means ineffective and responsive to the energization of the welding circuit to render said current adjusting means effective, and switch means connected to render another of the current adjusting means effective upon operation.

16. A direct current arc welding system comprising, a transformer having a primary winding for connection to a source of alternating current and a secondary winding, rectifier means connected to the secondary winding to provide unidirectional welding current, a saturable reactor having an impedance winding connected in series with the primary winding and a control winding, circuit means including a current transformer saturable below the normal value of welding current connected in series with one of the transformer windings and adjustable impedance means connected to control the energization of the control winding in accordance with the value of the welding current.

ALFRED B. WHITE.